(12) United States Patent
Kaltenbach et al.

(10) Patent No.: US 8,979,704 B2
(45) Date of Patent: Mar. 17, 2015

(54) HYBRID DRIVE OF A MOTOR VEHICLE AND METHOD FOR CONTROLLING A HYBRID DRIVE

(75) Inventors: Johannes Kaltenbach, Friedrichshafen (DE); Uwe Griesmeier, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/003,459

(22) PCT Filed: Feb. 1, 2012

(86) PCT No.: PCT/EP2012/051626
§ 371 (c)(1),
(2), (4) Date: Sep. 6, 2013

(87) PCT Pub. No.: WO2012/123168
PCT Pub. Date: Sep. 20, 2012

(65) Prior Publication Data
US 2013/0345019 A1 Dec. 26, 2013

(30) Foreign Application Priority Data
Mar. 11, 2011 (DE) .......................... 10 2011 005 451

(51) Int. Cl.
*B60K 6/48* (2007.10)
*B60W 20/00* (2006.01)
(Continued)

(52) U.S. Cl.
CPC ................ *B60W 20/40* (2013.01); *B60K 6/387* (2013.01); *B60K 6/442* (2013.01); *B60K 6/547* (2013.01);
(Continued)

(58) Field of Classification Search
None
See application file for complete search history.

(56) References Cited

U.S. PATENT DOCUMENTS 6,634,247 B2 10/2003 Pels et al.
7,272,987 B2 * 9/2007 Hughes ........................... 74/340
(Continued)

FOREIGN PATENT DOCUMENTS

DE 35 46 454 A1 2/1987
DE 199 60 621 A1 6/2001
(Continued)

OTHER PUBLICATIONS

Tenberge P: "Double-Clutch Transmission—Power-Shiftable Winding Transmission", VDI Berischte, Duesseldorf, Germany, vol. 1665, Mar. 13, 2002.
(Continued)

*Primary Examiner* — Justin Holmes
*Assistant Examiner* — David Morris
(74) *Attorney, Agent, or Firm* — Davis & Bujold, PLLC; Michael J. Bujold (57) ABSTRACT

A hybrid drive of a motor vehicle having an automated manual transmission with two input shafts and a common output shaft. The first input shaft can be connected to the drive shaft of an internal combustion engine by a clutch and can be brought into a drive connection to the output shaft by a first group of shiftable gearwheel sets. The second input shaft has a drive connection to the rotor of an electric machine, which can operate as a motor and a generator, and can be brought into a drive connection with the output shaft by a second group of selectively shiftable gearwheel sets. The input shafts can be coupled by coupling-shift element. The hybrid drive is provided with a second electric machine, which can operate as a motor and a generator and has a rotor that can be connected to the first input shaft.

10 Claims, 3 Drawing Sheets

(51) Int. Cl.
  *B60K 6/387* (2007.10)
  *B60K 6/442* (2007.10)
  *B60K 6/547* (2007.10)
  *B60W 30/19* (2012.01)
  *F16H 3/00* (2006.01)
  *F16H 3/089* (2006.01)

(52) U.S. Cl.
  CPC . *B60K 2006/4825* (2013.01); *B60K 2006/4841* (2013.01); *B60W 30/19* (2013.01); *F16H 3/006* (2013.01); *F16H 3/089* (2013.01); *F16H 2200/0047* (2013.01); *Y02T 10/6234* (2013.01); *Y02T 10/6252* (2013.01); *Y10S 903/902* (2013.01)
  USPC ............. 477/5; 180/65.7; 74/330; 74/340; 903/902

(56) References Cited

U.S. PATENT DOCUMENTS

| | | | |
|---|---|---|---|
| 7,287,442 | B2 | 10/2007 | Gumpoltsberger |
| 8,257,221 | B2 | 9/2012 | Leufgen |
| 8,342,049 | B2 | 1/2013 | Rieger |
| 8,393,238 | B2 | 3/2013 | Gumpoltsberger et al. |
| 2005/0139035 | A1 | 6/2005 | Lee et al. |
| 2006/0130601 | A1 | 6/2006 | Hughes |
| 2010/0120580 | A1 | 5/2010 | Mepham et al. |
| 2010/0197436 | A1 | 8/2010 | Ideshio et al. |
| 2010/0311540 | A1 | 12/2010 | Hellenbroich |

FOREIGN PATENT DOCUMENTS

| | | |
|---|---|---|
| DE | 101 33 695 A1 | 3/2002 |
| DE | 103 05 241 A1 | 9/2004 |
| DE | 10 2005 048 938 A1 | 4/2007 |
| DE | 10 2005 049 992 A1 | 4/2007 |
| DE | 10 2006 036 758 A1 | 2/2008 |
| DE | 10 2007 042 949 A1 | 4/2009 |
| DE | 10 2007 049 266 A1 | 4/2009 |
| DE | 10 2007 049 271 A1 | 4/2009 |
| DE | 10 2009 000 725 A1 | 8/2010 |
| DE | 10 2010 030 569 A1 | 12/2011 |
| EP | 1 610 038 A1 | 12/2005 |
| EP | 1 972 481 A1 | 9/2008 |
| FR | 2 811 395 A1 | 1/2002 |
| JP | 2010-203605 A | 9/2010 |
| WO | 2007/042109 A1 | 4/2007 |
| WO | 2008/138387 A1 | 11/2008 |
| WO | 2009/050078 A2 | 4/2009 |
| WO | 2012/000706 A1 | 1/2012 |

OTHER PUBLICATIONS

German Search Report Corresponding to 10 2011 005 451.0 mailed Jan. 23, 2012.
German Search Report Corresponding to 10 2011 005 532.0 mailed Jan. 27, 2012.
International Search Report Corresponding to PCT/EP2012/051626 mailed Mar. 20, 2012.
International Search Report Corresponding to PCT?EP2012/051629 mailed May 14, 2012.
International Search Report Corresponding to PCT/EP2012/051632 mailed Mar. 20, 2012.
Written Opinion Corresponding to PCT/EP2012/051626 mailed Mar. 20, 2012.
Written Opinion Corresponding to PCT/EP2012/051629 mailed May 14, 2012.
Written Opinion Corresponding to PCT/EP2012/051632 mailed Mar. 20, 2012.

* cited by examiner

| Operating mode | S1 | S2 | EM1 | EM2 |
|---|---|---|---|---|
| Electric drive operation using EM1 | N | C | G1 | -- |
| Electric drive operation using EM1+EM2 | A | C | G1 | G1 |
| Electric drive operation using EM1+EM2 | B | C | G1 | G2 |
| Maintain traction using EM2 | B | N | -- | G2 |
| Electric drive operation using EM1+EM2 | B | D | G3 | G2 |
| Electric drive operation using EM1+EM2 | A | D | G3 | G3 |
| Electric drive operation using EM1 | N | D | G3 | -- |

Fig. 2a

| Gearwheel | $n_Z$ | i |
|---|---|---|
| z11 | 15 | 3,8 |
| z21 | 57 | |
| z12 | 17 | 1,17 |
| z22 | 20 | |
| z13 | 27 | 1,89 |
| z23 | 51 | |
| z24 | 15 | 3,0 |
| z34 | 45 | |

Fig. 2b

HYBRID DRIVE OF A MOTOR VEHICLE AND METHOD FOR CONTROLLING A HYBRID DRIVE

This application is a National Stage completion of PCT/EP2012/051626 filed Feb. 1, 2012, which claims priority from German patent application serial no. 10 2011 005 451.0 filed Mar. 11, 2011.

FIELD OF THE INVENTION

The invention relates to a hybrid drive of a motor vehicle, which comprises an automated manual transmission having two input shafts and a common output shaft, wherein the first input shaft of this hybrid drive can be connected to the drive shaft of an internal combustion engine by means of a separating clutch and can be brought into a drive connection to the output shaft by means of a first group of selectively shiftable gearwheel sets, the second input shaft of this hybrid drive has a drive connection to the rotor of an electric machine, which can be operated as a motor and as a generator, and can be brought into a drive connection to the output shaft by means of a second group of selectively shiftable gearwheel sets, and the input shafts of this hybrid drive can be coupled to each other by means of an engagable and disengagable coupling-shift element. The invention also relates to a method for controlling a hybrid drive of this type, by means of which a gear shift can be implemented in the manual transmission during an electric drive operation without an interruption of tractive force.

BACKGROUND OF THE INVENTION

Document DE 199 60 621 B4 describes a hybrid drive of this type having three embodiments of a manual transmission. In all variants, the power transmission branch of the manual transmission associated with the internal combustion engine comprises a first countershaft, which can be brought into a drive connection to the drive shaft of an internal combustion engine on the input side by means of an input constant, a first input shaft, and a friction coupling, and which can be brought into a drive connection to an output shaft on the output side by means of a first group of selectively shiftable gearwheel sets. In the first variant embodiment according to FIG. 1 therein, a second input shaft is designed as a second countershaft, which is connected in a rotationally fixed manner to the rotor of an electric machine and can be brought into a drive connection to the output shaft by means of a second group of selectively shiftable gearwheel sets. In this case, the initially mentioned coupling-shift element is designed as a shifting clutch, which is disposed between the drive wheel—on the countershaft side—of a drive stage disposed between the first input shaft and the second input shaft, and the second countershaft.

In the second and third embodiments according to FIGS. 2 and 3 therein, the second input shaft is designed as a hollow rotor shaft, which is coaxially disposed over the first input shaft and is connected in a rotationally fixed manner to the rotor of an electric machine, which is coaxially disposed over the first input shaft. The rotor shaft is connected in a driving manner by means of a second input constant to the second countershaft, which can be brought into a drive connection to the output shaft by means of the second group of selectively shiftable gearwheel sets. In this case, the coupling-shift element is designed as a shifting clutch, which is disposed between the first input shaft and the rotor shaft.

In another hybrid drive of this type, according to WO 2008/138 387 A1, the two input shafts of the applicable manual transmission are designed as countershafts. The first input shaft or countershaft of the power transmission branch associated with the internal combustion engine can be connected to the drive shaft of an internal combustion engine on the input side by means of a controllable separating clutch, and can be brought into a drive connection to an output shaft on the output side by means of a first group of selectively shiftable gearwheel sets. The second input shaft or countershaft of the power transmission branch associated with the electric motor is connected in a rotationally fixed manner to the rotor of an electric machine on the input side, and can be brought into a drive connection to the output shaft on the output side by means of a second group of selectively shiftable gearwheel sets. The gearwheel sets of both groups are disposed in common radial planes and each use a common output gear disposed on the output shaft. The idler gears and the associated gear clutches of two axially adjacent gearwheel sets of the second group are combined in a shifting group and are disposed on the output shaft. As a result, the gear clutches of the gearwheel sets of the first group that use the same idler gears also function as coupling-shift elements, by means of which both input shafts can be coupled independently of the shifting of one of the applicable gearwheel sets.

Document DE 10 2010 030 569 A1, which was not previously published, makes known various embodiments of a hybrid drive of the type in question, in which the applicable manual transmission is derived from a double clutch transmission having two coaxially disposed input shafts. While the centrally disposed, first input shaft can be connected to the drive shaft of the internal combustion engine by means of a separating clutch, the second input shaft, which is designed as a hollow shaft and is coaxially disposed over the first input shaft, has a drive connection to the rotor of the electric machine directly or by means of an input transmission stage. The coupling-shift element for coupling the two input shafts is designed as a friction clutch or a claw clutch, and is disposed external to the transmission directly between the two input shafts.

The hybrid drive under consideration here can therefore be implemented with manual transmissions having different designs. However, a common feature of all embodiments of manual transmissions is that each one comprises a power transmission branch associated with the internal combustion engine and a power transmission branch associated with the electric motor, which are combined at the output shaft. In each case, the power transmission branch associated with the internal combustion engine comprises the first input shaft, the gearwheel sets of the first group, and the output shaft, and enables torque to be transferred between the internal combustion engine and the drive wheels of the motor vehicle, which have a drive connection to the output shaft. In each case, the power transmission branch associated with the electric motor comprises the second input shaft, the gearwheel sets of the second group, and the output shaft, and enables torque to be transferred between the electric motor and the drive wheels of the motor vehicle.

In this type of hybrid drive, with the coupling-shift element disengaged, a drive operation using only the internal combustion engine can therefore be implemented by engaging a gearwheel set of the first group, a drive operation using only an electric motor can be implemented by engaging a gearwheel set of the second group, and a combination drive operation of both assemblies (internal combustion engine and electric machine) with the electric machine in a motor mode or a generator mode can be implemented by engaging a gearwheel set of both the first and second groups.

Gear shifts can also be implemented as power shifts within one group of gearwheel sets by at least partially maintaining the tractive force during the gear shift by means of the assembly (internal combustion engine or electric machine) assigned to the other group of gearwheel sets, by means of a gearwheel set engaged therein.

The internal combustion engine can be started using the electric machine by engaging the coupling-shift element with the motor vehicle at a standstill. Engaging the coupling-shift element also makes the gearwheel sets of the second group available for the drive operation using the internal combustion engine, and makes the gearwheel sets of the first group available for the drive operation using the electric motor. Therefore, given an appropriate gear ratio and assignment of the gearwheel sets, fewer gearwheel sets are required overall and the manual transmission can therefore have a simpler and more compact design.

The disadvantage of these known hybrid drives is that a gear shift implemented in the manual transmission during an electric drive operation, i.e. with the internal combustion engine shut off and/or decoupled by disengaging the separating clutch, is necessarily associated with an interruption of tractive force, which results in unwanted losses of comfort and dynamics. In addition, the gear clutches of the gearwheel sets of the first group cannot be externally synchronized during an electric drive operation and must therefore be designed as synchronous clutches.

SUMMARY OF THE INVENTION

The problem addressed by the present invention is therefore that of developing the hybrid drive of the initially described type in a simple manner in terms of improving the operating characteristics such that, in particular, a gear shift can also be implemented in the manual transmission during the electric drive operation without an interruption of tractive force. In addition, a method for controlling a hybrid drive of this type shall be provided, by means of which a gear shift can be implemented in the manual transmission during an electric drive operation without an interruption of tractive force.

The problem related to the hybrid drive is solved in combination with the features described below and in that a second electric machine is provided, which can be operated as a motor and as a generator, wherein the rotor thereof has a drive connection to the first input shaft.

Advantageous embodiments and developments of the hybrid drive according to the invention are also described herein.

The invention therefore proceeds from a hybrid drive of a motor vehicle, which is known per se and comprises an automated manual transmission having two input shafts and a common output shaft. The first input shaft of the manual transmission can be connected to the drive shaft of an internal combustion engine VM by means of a separating clutch, and can be brought into a drive connection to the output shaft by means of a first group of selectively shiftable gearwheel sets. The second input shaft of the manual transmission has a drive connection to the rotor of an electric machine, which can be operated as a motor and as a generator, and can be brought into a drive connection to the output shaft by means of a second group of selectively shiftable gearwheel sets. The two input shafts can be coupled to each other by means of an engageable and disengageable coupling-shift element. In order to improve the operating characteristics of the hybrid drive, according to the invention, a second electric machine is provided, which can be operated as a motor and as a generator, wherein the rotor thereof has a drive connection to the first input shaft.

The second electric machine can be used to synchronize the gear clutches of the gearwheel sets of the first group with the separating clutch disengaged and the coupling-shift element disengaged, and can therefore be designed as cost-effective claw clutches. The main advantage of the second electric machine is that a gear shift can be implemented in the manual transmission during an electric drive operation, i.e. with the internal combustion engine shut off and/or decoupled by disengaging the separating clutch, without an interruption of tractive force, in that the second electric machine outputs a torque during the gear shift and transfers the torque to the output shaft by means of an engaged gearwheel set.

The second electric machine is preferably embodied as a starter-generator, which is designed to output less power than the first electric machine and which can be operated only briefly as a motor, since at least one assembly is still required for these functions, and the construction space requirement and possible extra weight are therefore relatively inconsequential.

The rotor of the second electric machine can have a drive connection to the first input shaft directly or by means of an input transmission stage. In the case of a direct drive connection of the rotor, the second electric machine is disposed coaxially over the first input shaft, but in the case of an indirect drive connection by means of an input transmission stage, the arrangement of the second electric machine relative to the first input shaft can be coaxial or axially parallel.

The invention further relates to a control method for a hybrid drive of a motor vehicle, which comprises an automated manual transmission having two input shafts and a common output shaft, wherein the first input shaft of this hybrid drive can be connected to the drive shaft of an internal combustion engine by means of a separating clutch and can be brought into a drive connection to the output shaft by means of a first group of selectively shiftable gearwheel sets, the second input shaft of this hybrid drive has a drive connection to the rotor of an electric machine, which can be operated as a motor and as a generator, and can be brought into a drive connection to the output shaft by means of a second group of selectively shiftable gearwheel sets, and the input shafts of this hybrid drive can be coupled to each other by means of an engagable and disengagable coupling-shift element, wherein a gear shift in the manual transmission takes place during an electric drive operation without an interruption of tractive force. To this end, according to the invention, a second electric machine, which can be operated as a motor and as a generator, and the rotor of which has a drive connection to the first input shaft, transfers torque during the gear shift at least briefly to the output shaft by means of an engaged gearwheel set of the first group with the coupling-shift element disengaged.

As a result, an interruption of tractive force due to shifting during the electric drive operation is prevented, and the driving comfort and driving dynamics are improved.

Advantageous embodiments and developments of the control method according to the invention are described herein.

Specific shift sequences are presented first in the following, which, in an embodiment of the aforementioned method, can be used during an electric drive operation using the first electric machine. It is assumed that the second electric machine is relatively low-power and is suited only for brief operation as a motor, and so the applicable motor vehicle is driven by the first electric machine both before and after the gear shift.

Therefore, in an electric drive operation with the first electric machine in a load gearwheel set (e.g. G2; Z1) of the second group, a gear shift into a target gearwheel set (e.g. G3; Z3) of the first group is implemented with the steps of:
   a) disengaging the coupling-shift element, provided this is engaged,
   b) synchronizing the gear clutch (E; B) of the target gearwheel set (G3; Z3) by means of the second electric machine,
   c) engaging the gear clutch (E; B) of the target gearwheel set (G3; Z3),
   d) simultaneously decreasing the load on the first electric machine and increasing the load on the second electric machine,
   e) disengaging the gear clutch (A; C) of the load gearwheel set (G2; Z1),
   f) synchronizing the coupling-shift element by means of the first electric machine,
   g) engaging the coupling-shift element, and
   h) simultaneously decreasing the load on the second electric machine and increasing the load on the first electric machine.

In an electric drive operation with the first electric machine in a load gearwheel set (e.g. G3; Z3) of the first group, however, a gear shift into a target gearwheel set (e.g. G4; Z2) of the second group is implemented with the steps of:
   a) simultaneously decreasing the load on the first electric machine and increasing the load on the second electric machine,
   b) disengaging the coupling-shift element,
   c) synchronizing the gear clutch (B; D) of the target gearwheel set (G4; Z2) by means of the first electric machine,
   d) engaging the gear clutch (B; D) of the target gearwheel set (G4; Z2),
   e) simultaneously decreasing the load on the second electric machine and increasing the load on the first electric machine, and
   f) disengaging the gear clutch (E; B) of the load gearwheel set (G3; Z3).

In an electric drive operation with the first electric machine in a load gearwheel set (e.g. G2; Z1) of the second group, a gear shift into a target gearwheel set (e.g. G4; Z2) of the second group is implemented with the steps of:
   a) disengaging the coupling-shift element, provided this is engaged,
   b) synchronizing the gear clutch (E; B) of an intermediate gearwheel set (e.g. G3; Z3) of the first group by means of the second electric machine,
   c) engaging the gear clutch (E; B) of the intermediate gearwheel set (G3; Z3),
   d) simultaneously decreasing the load on the first electric machine EM1 and increasing the load on the second electric machine,
   e) disengaging the gear clutch (A; C) of the load gearwheel set (G2; Z1),
   f) synchronizing the gear clutch (B; D) of the target gearwheel set (G4; Z2) by means of the first electric machine,
   g) engaging the gear clutch (B; D) of the target gearwheel set (G4; Z2),
   h) simultaneously decreasing the load on the second electric machine and increasing the load on the first electric machine, and
   i) disengaging the gear clutch (E; B) of the intermediate gearwheel set (G3; Z3).

Finally, in an electric drive operation with the first electric machine in a load gearwheel set (e.g. G3) of the first group, a gear shift into a target gearwheel set (e.g. G5) of the first group is implemented with the steps of:
   a) simultaneously decreasing the load on the first electric machine and increasing the load on the second electric machine,
   b) disengaging the coupling-shift element,
   c) synchronizing the gear clutch (B) of an intermediate gearwheel set (e.g. G4) of the second group by means of the first electric machine,
   d) engaging the gear clutch (B) of the intermediate gearwheel set (G4),
   e) simultaneously decreasing the load on the second electric machine and increasing the load on the first electric machine,
   f) disengaging the gear clutch (E) of the load gearwheel set (G3).
   g) synchronizing the gear clutch (F) of the target gearwheel set (G5) by means of the second electric machine,
   h) engaging the gear clutch (F) of the target gearwheel set (G5),
   i) simultaneously decreasing the load on the first electric machine and increasing the load on the second electric machine,
   j) disengaging the gear clutch (B) of the intermediate gearwheel set (G4),
   k) synchronizing the coupling-shift element by means of the first electric machine,
   l) engaging the coupling-shift element, and
   m) simultaneously decreasing the load on the second electric machine and increasing the load on the first electric machine.

In addition to an at least brief support of the first electric machine by the second electric machine in the boost mode and in the electric drive mode, the second electric machine can also be used to start the internal combustion engine during an electric drive operation. This preferably takes place, in a highly comfortable manner, in that, in an electric drive operation with the first electric machine in a gearwheel set of the second group, the internal combustion engine is started by means of the second electric machine with the coupling-shift element disengaged and the separating clutch engaged. This starting procedure of the internal combustion engine is barely perceptible by the vehicle occupants, since the second electric machine and the internal combustion engine are mechanically decoupled from the output shaft of the manual transmission at the time.

If the separating clutch is designed as a friction clutch, the starting of the internal combustion engine can also be implemented as a pulse start, i.e. with an initial revving-up of the first input shaft by the second electric machine followed by a rapid engagement of the separating clutch.

A serial hybrid drive operation is also possible with the second electric machine, i.e. a drive operation without the drive shaft of the internal combustion engine being mechanically connected to the output shaft of the manual transmission, in which the second electric machine is driven in the generator mode by the internal combustion engine with the coupling-shift element disengaged and the separating clutch engaged, and in which the first electric machine, in the motor mode, drives the output shaft by means of an engaged gearwheel set of the second group.

BRIEF DESCRIPTION OF THE DRAWINGS

To illustrate the invention, a drawing having example embodiments follows the description. Shown are.

DETAILED DESCRIPTION OF THE PREFERRED EMBODIMENTS

Figure 1:
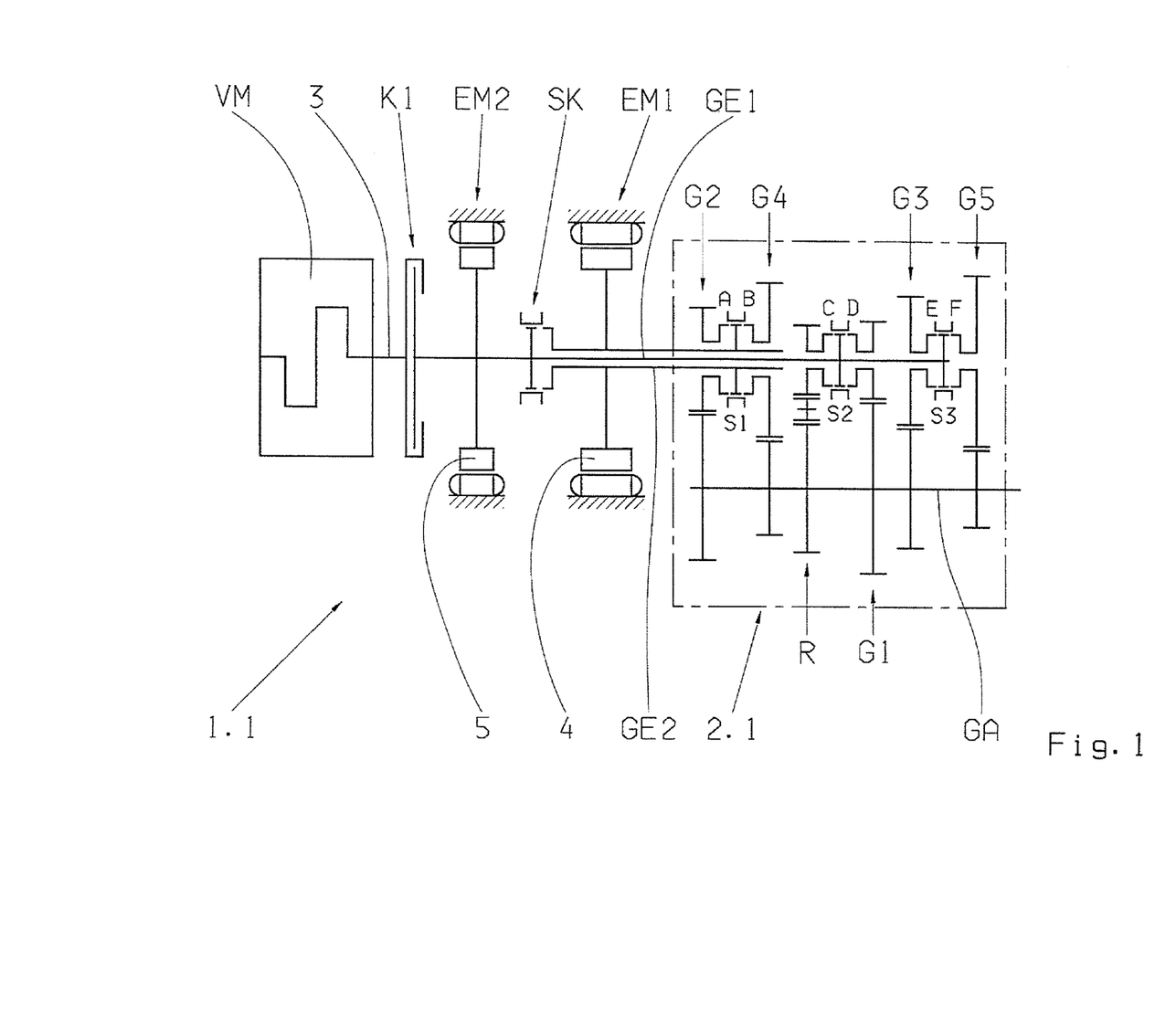
FIG. 1 a first hybrid drive of a motor vehicle in a schematic depiction.

FIG. 1 shows, in a schematic form, a hybrid drive 1.1 designed according to the invention and comprising a manual transmission 2.1, which is derived from a double clutch transmission having two coaxially disposed input shafts GE1, GE2 and a common output shaft GA. The centrally disposed, first input shaft GE1 can be connected to the drive shaft 3 of an internal combustion engine VM by means of a separating clutch K1, which is designed as a friction clutch in the present case, as an example. The second input shaft GE2, which is designed as a hollow shaft and is coaxially disposed over the first input shaft GE1, has a direct drive connection to the rotor 4 of a first electric machine EM1. Internal to the transmission, both input shafts GE1, GE2 can be brought into a drive connection to the output shaft GA by means of a plurality of selectively shiftable gearwheel sets R, G1, G3, G5 or G2, G4.

In the present case, the reverse gearwheel set R of the reverse gear is assigned to the first input shaft GE1, and the gearwheel sets G1, G3, G5 are assigned to the odd numbered forward gears. The gearwheel sets G2, G4 of the even numbered forward gears are assigned to the second input shaft GE2. The idler gears and the gear clutches A, B, C, D, E, F of the gearwheel sets R, G1, G3, G5 and G2, G4 are each disposed on the assigned input shaft GE1, GE2, respectively, while each of the applicable fixed gears is disposed in a rotationally fixed manner on the output shaft GA. The gear clutches A to F are combined in pairs in a common shifting group S1, S2, S3 in each case. For example, the gear clutches A and B of the gearwheel sets G2, G4 of the second and fourth forward gears are disposed in a first shifting group S1, the gear clutches C, D of the reverse gearwheel set R of the reverse gear and the gearwheel set G1 of the first forward gear are disposed in a second shifting group S2, and the gear clutches E, F of the gear wheel sets G3, G5 of the third and the fifth forward gears are disposed in a third shifting group S3.

The two input shafts GE1, GE2 can be coupled to each other by means of a coupling-shift element SK, which is designed as a claw clutch and is disposed externally to the transmission in the present case, as an example. In addition, a second electric machine EM2 is provided, which is designed to output less power than the first electric machine EM1 and is axially disposed between the separating clutch K1 and the coupling-shift element SK, wherein the rotor 5 thereof has a direct drive connection to the first input shaft GE1 in the present case, as an example.

The second electric machine EM2, in the motor mode, can transfer torque at least briefly to the output shaft GA by means of an engaged gearwheel set R, G1, G3, G5 of the first group, thereby making it possible to implement a gear shift without an interruption of tractive force, in particular during electric drive operation using the first electric machine EM1. Furthermore, in the event of a gear shift, the gear clutches C, D, E, F of the gearwheel sets R, G1, G3, G5 of the first group can be synchronized by means of the second electric machine EM2, and so these gear clutches C, D, E, F are designed as cost-effective claw clutches. The second electric machine EM2 can also be used, at least briefly, to support the first electric machine EM1 in the boost mode and in the electric drive mode.

Figure 2:
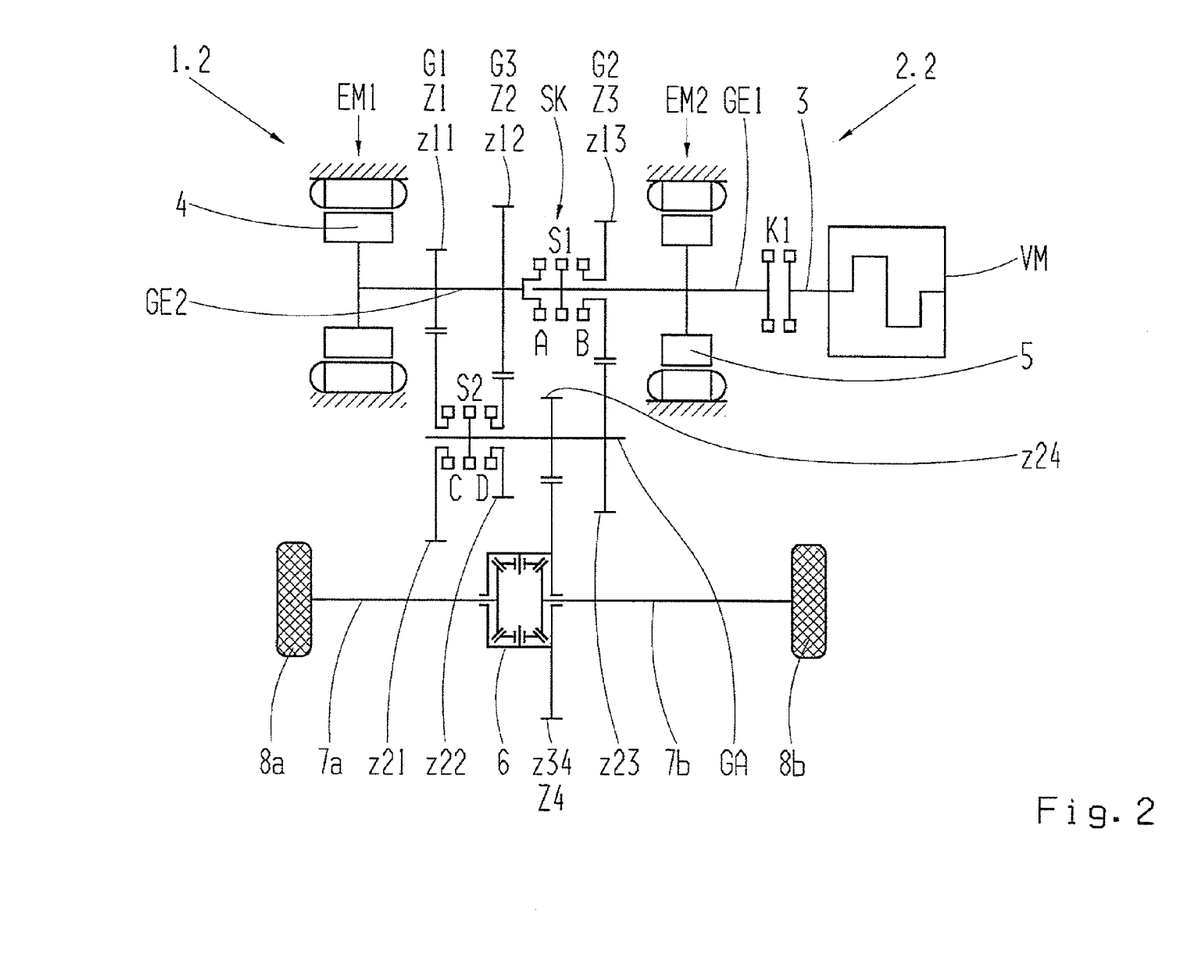
FIG. 2 a second hybrid drive of a motor vehicle in a schematic depiction.

FIG. 2 shows, in a schematic form, a further hybrid drive 1.2 according to the invention, which comprises a differently designed manual transmission 2.2 having two input shafts GE1, GE2 and a common output shaft GA. The first input shaft GE1 can be connected to the drive shaft 3 of an internal combustion engine VM by means of a separating clutch K1, which is designed as a claw clutch in the present case, as an example. The second input shaft GE2 has a direct drive connection to the rotor 4 of a first electric machine EM1. The two input shafts GE1, GE2 are disposed colinearly and axially adjacent to each other, and can be coupled to each other by means of a coupling-shift element SK designed as an engagable and disengagable shifting clutch A.

The second input shaft GE2 can be selectively connected to the output shaft GA, which is disposed axially parallel to the two input shafts GE1, GE2, by means of a first gearwheel set Z1 and a second gearwheel set Z2. The first gearwheel set Z1 and the second gearwheel set Z2 each comprise a fixed gear z11, z12, respectively, which are disposed in a rotationally fixed manner on the second input shaft GE2, and an idler gear z21, z22, respectively, which are rotatably supported on the output shaft GA and can be connected thereto by means of an engagable and disengagable gear clutch C, D. The two gear clutches C, D are combined in a common shifting group S2 and can therefore be alternately engaged and disengaged.

The first input shaft GE1 can be connected to the output shaft GA by means of a third gearwheel set Z3. The third gearwheel set comprises an idler gear z13, which is rotatably supported on the first input shaft GE1 and can be connected thereto by means of an engagable and disengagable gear clutch B, and a fixed gear z23, which is disposed in a rotationally fixed manner on the output shaft GA. The coupling-shift element SK, which is formed by the shifting clutch A, for coupling the two input shafts GE1, GE2 and the gear clutch for shifting the third gearwheel set Z3 are combined in a common shifting group S1 and are therefore alternately engagable and disengagable. In addition, the first input shaft GE1 has a direct drive connection to the rotor 5 of a second electric machine EM2, which is designed to output less power than the first electric machine EM1 and is axially disposed between the separating clutch K1 and the third gearwheel set Z3.

Figure 2A:
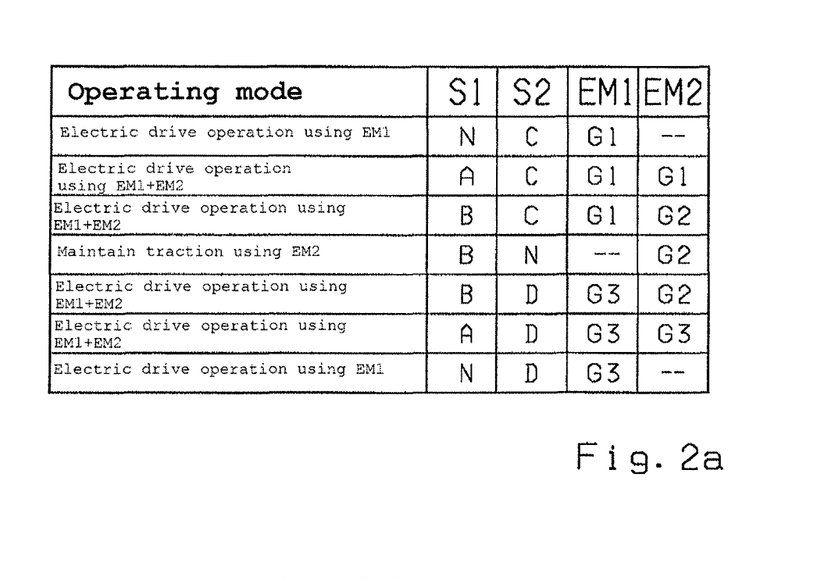
FIG. 2a an operating mode and transmission scheme of the hybrid drive according to FIG. 2 for an electric drive operation, in the form of a table, and FIG. 2b examples of gear ratios of the gearwheel sets of the hybrid drive according to FIG. 2, in the form of a table.
Figure 2B:
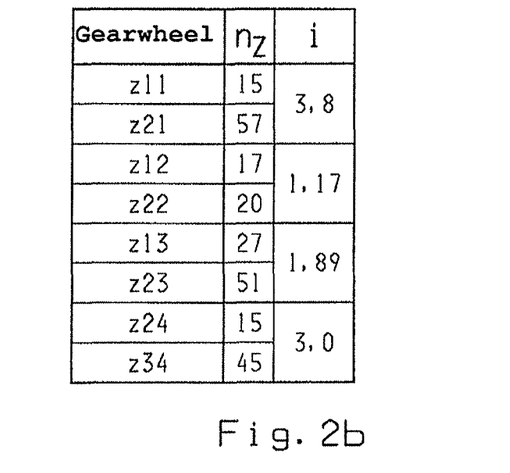

The output shaft GA has a drive connection to an axle differential 6 by means of an output gearwheel set Z4, which comprises two fixed gears z24, z34. Two axle shafts 7a, 7b, which are connected to a vehicle wheel 8a, 8b, respectively, of a drive axle, are each connected in a rotationally fixed manner to an output gearwheel of the axle differential 6. As shown in FIG. 2 and by reference to the tooth numbers $n_z$ and gear ratios i, which are provided in FIG. 2b as examples, the first gearwheel set Z1 forms the first gear G1, the second gearwheel set Z2 forms the third gear G3, and the third gearwheel set Z3 forms the second gear G2 of the manual transmission 4. The gearwheel sets Z1, Z2, Z3 are therefore alternately assigned to the input shafts GE1, GE2 in the order of the gear ratios thereof. Reverse drive operation is implemented by reversing the direction of rotation of the electric machine EM1 or EM2.

The hybrid drive 1.2 according to FIG. 2 comprises two gears G1, G3 for electric drive operation (shifting clutch A or coupling-shift element SK disengaged) and three gears G1, G2, G3 for internal-combustion drive operation (shifting clutch A or coupling-shift element SK engaged at least in G1, G3). In addition, in internal-combustion drive operation, a boost mode can be implemented in all gears G1, G2, G3, and a recuperation mode can be implemented using the first electric machine EM1 and/or the second electric machine EM2.

Furthermore, an electric energy accumulator, which is electrically connected to the first electric machine EM1 and/or the second electric machine EM2, can also be charged by the driving internal combustion engine VM when the vehicle is at a standstill. When the vehicle is at a standstill, the internal combustion engine VM can be started in a normal start by the first electric machine EM1 (gears G1, G2, G3 disengaged, shifting clutch A or coupling-shift element SK engaged) or by the second electric machine EM2 (gear G2 disengaged, shifting clutch A or coupling-shift element SK disengaged). In addition, the gear clutch B of the third gearwheel set Z3 or the second gear G2 can be synchronized by the second electric machine with the separating clutch K1 disengaged. The internal combustion engine VM can also be started in a normal start by the second electric machine EM2 during an electric drive operation using the first electric machine EM1 (G1 or G3 engaged, shifting clutch A or coupling-shift element SK disengaged) with the separating clutch K1 engaged.

The main advantage of the second electric machine EM2 is that, during an electric drive operation using the first electric machine EM1 (G1 or G3 engaged, shifting clutch A or coupling-shift element SK disengaged), a gear shift between the two gears G1, G3 can be implemented with the second gear G2 engaged, without an interruption of tractive force, by means of the output of a corresponding torque by the second electric machine EM2. The three gears G1, G2, G3 and shift positions of the shifting clutch A, and the gear clutches B, C, D, that are used for electric drive operation are listed in the table in FIG. 2a. Therein, the reference character N stands for the neutral position of the respective shifting group S1 or S2.

REFERENCE CHARACTERS 1.1 first hybrid drive
1.2 second hybrid drive
2.1 first manual transmission
2.2 second manual transmission
3 drive shaft of VM
4 rotor of EM1
5 rotor of EM2
6 axle differential
7a, 7b axle shaft
8a, 8b vehicle wheel
A gear clutch of G2, shift position of S1
B gear clutch of G4; Z3, shift position of S1
C gear clutch of R; Z1, shift position of S2
D gear clutch of G1; Z2, shift position of S2
E gear clutch of G3
EM1 first electric machine
EM2 second electric machine
F gear clutch of G5
G1-G5 gearwheel sets of the forward gears
G1-G3 gears
GA output shaft
GE1 first input shaft
GE2 second input shaft
i transmission ratio
K1 separating clutch
N neutral position
$n_z$ tooth number
R reverse gearwheel set of the reverse gear
S1-S3 shifting groups
SK coupling-shift element
VM internal combustion engine
Z1 first gearwheel set of 2.2
Z2 second gearwheel set of 2.2
Z3 third gearwheel set of 2.2
Z4 output gearwheel set of 2.2
z11 drive gear, fixed gear of Z1
z12 drive gear, fixed gear of Z2
z13 drive wheel, idler gear of Z3
z21 output gear, idler gear of Z1
z22 output gear, idler gear of Z2
z23 output gear, fixed gear of Z3
z24 drive gear, fixed gear of Z4
z34 output gear, fixed gear of Z4

The invention claimed is:

1. A hybrid drive for a motor vehicle comprising:
an automated manual transmission (2.1, 2.2) having first and second input shafts (GE1, GE2) and a common output shaft (GA),
the first input shaft (GE1) of the hybrid drive being connectable to a drive shaft (3) of an internal combustion engine (VM) by way of a separating clutch (K1) and being drivingly connectable to the output shaft (GA) by way of a first group of selectively shiftable gearwheel sets (G1, G3, G5, R; Z3),
the second input shaft (GE2) of the hybrid drive having a drive connection with a rotor (4) of a first electric machine (EM1), which is operable as a first motor and a first generator, and being drivingly connectable to the output shaft (GA) by way of a second group of selectively shiftable gearwheel sets (G2, G4; Z1, Z2),
the first and the second input shafts (GE1, GE2) of the hybrid drive being couplable to one another by way of an engagable and disengagable coupling-shift element (SK), the first and the second input shafts being coaxially aligned with respect to one another,
a second electric machine (EM2), which is operatable as a second motor and a second generator, comprising a rotor (5) that is drivingly connectable to the first input shaft (GE1), and
the first and the second input shafts are connectable via only one of the coupling-shift element and the separating clutch.

2. The hybrid drive according to claim 1, wherein the second electric machine (EM2) is a starter-generator and is designed to output less power than the first electric machine (EM1) and is only briefly operable as the second motor.

3. The hybrid drive according to claim 1, wherein the rotor (5) of the second electric machine (EM2) is drivingly connectable to the first input shaft (GE1) either directly or by way of an input transmission stage.

4. A method of controlling a hybrid drive (1.1, 1.2) of a motor vehicle, the hybrid drive comprises an automated manual transmission (2.1, 2.2) having first and second input shafts (GE1, GE2) and a common output shaft (GA), an engagable separating clutch (K1) connects the first input shaft (GE1) of the hybrid drive to a drive shaft (3) of an internal combustion engine (VM) so as to transmit drive between internal combustion engine and the first input shaft, and a first group of selectively shiftable gearwheel sets (G1, G3, G5, R; Z3) drivingly connect the first input shaft to the output shaft (GA), the second input shaft (GE2) of the hybrid drive is drivingly connected to a rotor (4) of a first electric machine (EM1), which is operable as a first motor and a first generator, a second group of selectively shiftable gearwheel sets (G2, G4; Z1, Z2) driving connect the second input shaft to the output shaft (GA), an engagable and disengagable coupling-shift element (SK) couples the first and the second input shafts (GE1, GE2) of the hybrid drive to one another and the first and the second input shafts are coaxially aligned with respect to one another, the method comprising the steps of:
- shifting gears in the manual transmission (2.1, 2.2) during electric drive operation without an interruption of tractive force by selective disengagement of one gearwheel, set in one of the first and the second groups and engagement of another gearwheel set in the other one of the first and the second groups;
- at least briefly, during the gear shift, transferring torque with a second electric machine (EM2), which is operable as a second motor and as a second generator and comprises a rotor (5) that is connected to the first input shaft (GE1), to the output shaft (GA) by engaging a gearwheel set (G1, G3, G5, R; Z3) of the first group while the coupling-shift element (SK) disengaged.

5. The method according to claim 4, wherein in an electric drive operation with the first electric machine (EM1) in a load gearwheel set (e.g., G2; Z1) of the second group, a gear shift into a target gearwheel set (e.g., G3; Z3) of the first group is implemented by the steps of:
a) decoupling the first and the second input shafts from each other by disengaging the coupling-shift element (SK), if the coupling-shift element (SK) is engaged,
b) synchronizing a gear clutch (E; B) of the target gearwheel set (G3; Z3) with the second electric machine (EM2),
c) engaging the target gearwheel set (G3; Z3) by engaging the gear clutch (E; B) thereof,
d) simultaneously reducing drive to the second input shaft by decreasing a load on the first electric machine (EM1) and increasing drive to the first input shaft by increasing a load on the second electric machine (EM2),
e) disengaging the load gearwheel set (G2; Z1) by disengaging a gear clutch (A; C) thereof,
f) synchronizing the coupling-shift element (SK) with the first electric machine (EM1),
g) coupling the first and the second input shafts to each other by engaging the coupling-shift element (SK), and
h) simultaneously reducing drive to the first input shaft by decreasing the load on the second electric machine (EM2) and increasing drive to the second input shaft by increasing the load on the first electric machine (EM1).

6. The method according to claim 4, wherein in an electric drive operation with the first electric machine (EM1) in a load gearwheel set (e.g., G3; Z3) of the first group, a gear shift into a target gearwheel set (e.g., G4; Z2) of the second group is implemented by the steps of:
a) simultaneously reducing drive to the second input shaft by decreasing a load on the first electric machine (EM1) and increasing drive to the first input shaft by increasing a load on the second electric machine (EM2),
b) decoupling the first and the second input shafts from each other by disengaging the coupling-shift element (SK),
c) synchronizing a gear clutch (B; D) of the target gearwheel set (G4; Z2) with the first electric machine (EM1),
d) engaging the target gearwheel set (G4; Z2) by engaging the gear clutch (B; D) thereof,
e) simultaneously reducing drive to the first input shaft by decreasing the load on the second electric machine (EM2) and increasing drive to the second input shaft by increasing the load on the first electric machine (EM1), and
f) disengaging the load gearwheel set (G3; Z3) by disengaging a gear clutch (E; B) thereof.

7. The method according to claim 4, wherein, in an electric drive operation with the first electric machine (EM1) in a load gearwheel set (e.g., G2; Z1) of the second group, a gear shift into a target gearwheel set (e.g., G4; Z2) of the second group is implemented by the steps of:
a) decoupling the first and the second input shafts from each other by disengaging the coupling-shift element (SK), if the coupling-shift element is engaged,
b) synchronizing a gear clutch (E; B) of an intermediate gearwheel set (e.g., G3; Z3) of the first group with the second electric machine (EM2),
c) engaging the intermediate gearwheel set (G3; Z3) by engaging the gear clutch (E; B) thereof,
d) simultaneously reducing drive to the second input shaft by decreasing a load on the first electric machine (EM1) and increasing drive to the first input shaft by increasing a load on the second electric machine (EM2),
e) disengaging the load gearwheel set (G2; Z1) by disengaging a gear clutch (A; C) thereof,
f) synchronizing a gear clutch (B; D) of the target gearwheel set (G4; Z2) with the first electric machine (EM1),
g) engaging the target gearwheel set (G4; Z2) by engaging a gear clutch (A; C) thereof,
h) simultaneously reducing drive to the first input shaft by decreasing the load on the second electric machine (EM2) and increasing drive to the second input shaft by increasing the load on the first electric machine (EM1), and
I) disengaging the intermediate gearwheel set (G3; Z3) by disengaging the gear clutch (E; B) thereof.

8. The method according to claim 4, wherein, in an electric drive operation with the first electric machine (EM1) in a load gearwheel set (e.g., G3) of the first group, a gear shift into a target gearwheel set (e.g., G5) of the first group is implemented by the steps of:
a) simultaneously reducing drive to the second input shaft by decreasing a load on the first electric machine (EM1) and increasing drive to the first input shaft by increasing a load on the second electric machine (EM2),
b) decoupling the first and the second input shafts from each other by disengaging the coupling-shift element (SK),
c) synchronizing a gear clutch (B) of an intermediate gearwheel set (e.g., G4) of the second group with the first electric machine (EM1),
d) engaging the intermediate gearwheel set (G4) by engaging the gear clutch (B) thereof,
e) simultaneously reducing drive to the first input shaft by decreasing the load on the second electric machine (EM2) and increasing drive to the second input shaft by increasing the load on the first electric machine (EM1),
f) disengaging a load gearwheel set (G3) by disengaging a gear clutch (E) thereof,
g) synchronizing a gear clutch (F) of a target gearwheel set (G5) with the second electric machine (EM2),
h) engaging the target gearwheel set (G5) by engaging the gear clutch (F) thereof,
I) simultaneously reducing drive to the second input shaft by decreasing the load on the first electric machine (EM1) and increasing drive to the first input shaft by increasing the load on the second electric machine (EM2),
j) disengaging the intermediate gearwheel set (G4) by disengaging the gear clutch (B) thereof, k) synchronizing the coupling-shift element (SK) with the first electric machine (EM1), l) coupling the first and the second input shafts to each other by engaging the coupling-shift element (SK), and m) simultaneously reducing drive to the first input shaft by decreasing the load on the second electric machine (EM2) and increasing drive to the second input shaft by increasing the load on the first electric machine (EM1).

9. The method according to claim 4, further comprising the step of, during an electric drive operation of the motor vehicle with the first electric machine (EM1) providing drive via a gearwheel set (G2, G4; Z1, Z2) of the second group, starting the internal combustion engine (VM) with drive from the second electric machine (EM2) by engaging the separating clutch (K1) while the coupling-shift element (SK) is disengaged.

10. The method according to claim 4, further comprising the step of, during a serial hybrid drive operation of the motor vehicle, driving the second electric machine (EM2) in a generator mode with the internal combustion engine (VM) by engaging the separating clutch (K1) while the coupling-shift element (SK) is disengaged, and the first electric machine (EM1), in a motor mode, drives the output shaft (GA) via an engaged gearwheel set (G2, G4; Z1, Z2) of the second group.

* * * * *